US012693915B1

(12) United States Patent
Verma et al.

(10) Patent No.: US 12,693,915 B1
(45) Date of Patent: Jul. 28, 2026

(54) SYSTEMS AND METHODS FOR DYNAMIC STATEFUL MESSAGE FOR STATELESS ORCHESTRATION

(71) Applicant: Morgan Stanley Services Group Inc., New York, NY (US)

(72) Inventors: Sandeep Verma, Maharashtra (IN); Monil Shah, Jersey City, NJ (US); Swati Nenawat, Karnataka (IN); Akash Sangwan, Maharashtra (IN); Shashank Agarwal, Maharashtra (IN); Paul Cherian, Maharashtra (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/348,372

(22) Filed: Oct. 2, 2025

(51) Int. Cl.
*G06F 9/54* (2006.01)

(52) U.S. Cl.
CPC .................................... *G06F 9/546* (2013.01)

(58) Field of Classification Search
CPC ....................................................... G06F 9/546
See application file for complete search history.

(56) References Cited

U.S. PATENT DOCUMENTS

| | | | |
|---|---|---|---|
| 9,460,304 | B1 | 10/2016 | Tsai et al. |
| 10,769,714 | B1 | 9/2020 | Vadaparty et al. |
| 10,867,351 | B1 | 12/2020 | Vadaparty et al. |
| 2019/0220331 | A1 | 7/2019 | Duggal et al. |
| 2021/0042161 | A1 | 2/2021 | Salchow et al. |
| 2023/0014565 | A1 | 1/2023 | Ray et al. |
| 2023/0143782 | A1 | 5/2023 | Williams |
| 2023/0254223 | A1 | 8/2023 | Boulos et al. |
| 2024/0104519 | A1 | 3/2024 | Jiang et al. |
| 2024/0385838 | A1 | 11/2024 | Yu et al. |
| 2025/0045601 | A1 | 2/2025 | Zuberi et al. |

*Primary Examiner* — Gregory A Kessler
(74) *Attorney, Agent, or Firm* — PEARL COHEN LLP

(57) ABSTRACT

A system and method for stateless orchestration and stateful message is provided. A message can be received by an orchestrator. The orchestrator can determine a list of microservices the message requires to execute the transaction based on a type of the message. The orchestrator can sequentially execute one or more microservices in the list of microservices, wherein each time a microservice is executed results of the execution are added to the message to create the stateful message.

10 Claims, 4 Drawing Sheets

110 receiving a message

120 determining a list of microservices the message requires to execute the transaction based on a type of the message

130 sequentially executing one or more microservices in the list of microservices, wherein each time a microservice is executed results of the execution are added to the message to create the stateful message Message before Orchestrator adds microservices

```
{
  "internalProcessing": {
    "processType": {
      "enumClass": "com.ms.fraud.common.model.processType",
      "value": "payment"                                          205
    },
    "transactionType": {
      "enumClass": "com.ms.fraud.common.model.transactionType",
      "value": "AAACheck"
    },
    "transactionFlow": {
      "name": "AAACheck",
      "steps": [
        {
          "id": 1,
          "tasks": [
            {
              "id": 1,                                             210
              "name": "scorer",
              "topicName": "topic.fraudtech.c-fh.score.dev.green"
            }
          ],
          "completed": true
        },
        {
          "id": 2,
          "tasks": [
            {
              "id": 1,                                            215
              "name": "enrichment",
              "topicName": "topic.fraudtech.c-fh.coreenrich.dev.green",
              "routeOnCondition": "isAlert"
            }
          ],
          "completed": false
        },
        {
          "id": 3,
          "tasks": [
            {
              "id": 1,                                            220
              "name": "Decision engine",
              "topicName": "topic.fraudtech.c-fh.rules.dev.green"
            }
          ],
          "completed": false
        }
      ]
```

FIG. 2B

```
"internalProcessing": {
  "processType": {
    "enumClass": "com.ms.fraud.common.model.processType",
    "value": "payment"
  },                                              205
  "transactionType": {
    "enumClass": "com.ms.fraud.common.model.transactionType",
    "value": "AAACheck"
  },
  "timestamp": "2025-09-05T11:32:46Z",
}
```

FIG. 2A

SYSTEMS AND METHODS FOR DYNAMIC STATEFUL MESSAGE FOR STATELESS ORCHESTRATION

FIELD OF THE INVENTION

The invention relates generally systems and method for dynamic stateful messages for stateless orchestration.

BACKGROUND

Modern platforms (e.g., fraud platforms) typically process millions of events daily with extremely high accuracy, resilience, and speed. Modern platforms typically use orchestrators to control message flows. Current orchestrators often maintain the state of the workflow externally, leading to challenges around scalability, replay ability, and/or dynamic flow adjustments in real time.

Current orchestrators are typically rigid, requiring significant reconfiguration when workflows needs dynamically change, which can be a frequent necessity in fraud detection domains due to evolving fraud patterns.

Typically, when orchestrators route messages, the state of the message is stored externally such that the orchestrator makes expensive system calls.

SUMMARY OF THE INVENTION

One advantage of the invention can be a stateless orchestration that can avoid expensive system calls and can provide scalability. Another advantage of the invention is that the message itself can become self-healing. Another advantage of the invention is avoidance of downtime to add new messages/flows to the system.

In one aspect, the invention involves a method for stateless orchestration and stateful message. The method can involve receiving, by an orchestrator, a message. The method can involve determining, by the orchestrator, a list of microservices the message requires to execute the transaction based on a type of the message. The method can involve sequentially executing, by the orchestrator, one or more microservices in the list of microservices, wherein each time a microservice is executed results of the execution are added to the message to create the stateful message.

In some embodiments, the method involves adding details about the message and the list of microservices to the message. In some embodiments, the details include a classification of the message, type of the transaction, identifier or any combination thereof.

In some embodiments, the results of the execution include whether the microservice completed, time of the execution, retry count, error codes or any combination thereof.

In some embodiments, the method involves determining, by the orchestrator, whether the message has a maximum number of retries that exceed the predetermined maximum number of retries. In some embodiments, determining the list of microservices involves retrieving lookup table from memory.

In some embodiments, the method involves determining, by the orchestrator, which microservice to execute based on the stateful message.

In another aspect, the invention includes a system for stateless orchestration and stateful message. The system can include a memory. The system can also include an orchestrator configured to receiving a message. The orchestrator can also be configured to determine a list of microservices the message requires to execute the transaction based on a type of the message, and sequentially execute one or more microservices in the list of microservices, wherein each time a microservice is executed results of the execution are added to the message to create the stateful message.

In some embodiments, the orchestrator is further configured to add details about the message and the list of microservices to the message. In some embodiments, the details include a classification of the message, type of the transaction, identifier or any combination thereof.

In some embodiments, the results of the execution include whether the microservice completed, time of the execution, retry count, error codes or any combination thereof. In some embodiments, the orchestrator is further configured to determine whether the message has a maximum number of retries that exceed the predetermined maximum number of retries.

In some embodiments, determine the list of microservices further comprises retrieving lookup table from memory. In some embodiments, the orchestrator is further configured determine which microservice to execute based on the stateful message.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous, or similar elements, and in which:

FIG. 2 is an example of a message having a plurality of microservice outcomes added to the message, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/ or circuits have not been described in detail so as not to obscure the invention.

Figure 1:
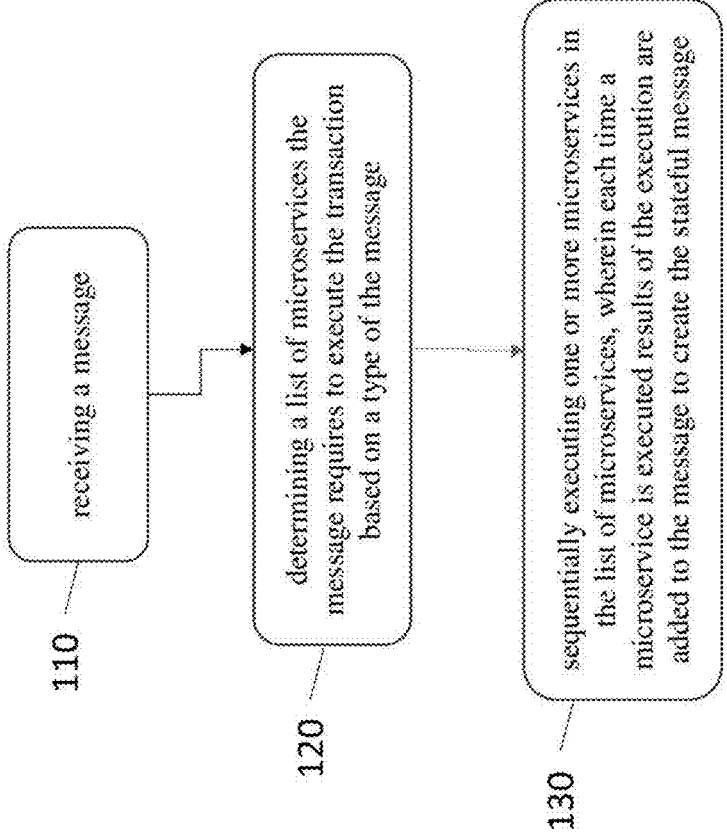
FIG. 1 is a flow diagram of a method for stateless orchestration and stateful message, according to some embodiments of the invention.

FIG. 1 is a flow diagram of a method for stateless orchestration and stateful message, according to some embodiments of the invention.

The method can involve receiving, by an orchestrator (e.g., a processor) a message. The message can an initial message that indicates a transaction (Step 110). The message can be sent by another system (e.g., a financial institution).

The method can involve determining, by the orchestrator, a list of microservices the message requires to execute the transaction based on a type of the message (Step 120). The orchestrator can retrieve from memory a list of microservices to implement based on the type of the message. For example, if the message type is a wire message, a first list of microservices can be retrieved. If the message type is a check message, a second list of microservices can be retrieved. The list of microservices for each message type can be input by a user. The list of microservices for each message type can be a lookup table that correlates the type of message to the list of microservices. As is apparent to one of ordinary skill, in this manner the list of microservices can be modified and/or types of messages can be updated without modifying the orchestrator. In this manner, the list of microservices and/or types of messages can be modified in real-time.

In some embodiments, the list of microservices can be in a configuration file. For example, each message type can have a corresponding configuration file. The configuration file can include a list of microservices to execute for the message type. Table 1 as shown below is an example configuration file for the message type "Branch Wire."

TABLE 1

```
name: "BranchWire"
steps:
  - id: 1
    tasks:
      - id: 1
        name: "Enrichment"
        topicName: "topic-fraudtech-c-fh-branchcoreenrich-prod-blue"
        partitions: "8,9,10,11"
      - id: 2
        name: "Sla Monitor"
        topicName: "topic-fraudtech-c-fh-sla-prod"
        partitions: "0,1,2,3,4,5,6,7,8,9"
  - id: 2
    tasks:
      - id: 1
        name: "Scorer"
        topicName: "topic-fraudtech-c-fh-score-prod-blue"
        partitions: "0,1,2"
  - id: 3
    tasks:
      - id: 1
        name: "Decision Engine"
        topicName: "topic-fraudtech-c-fh-rules-prod-blue"
        partitions: "14,15"
```

As shown in Table 1, the message type "BranchWire" has three steps corresponding to id: 1; id: 2 and id: 3., wherein the id indicates the order in which service is executed. For example, in Table 1, id: 1 is executed first, id: 2 is executed second and id: 3 is executed third. Each step can include one or more microservices. Task id: 1 can include two microservices, "Enrichment" and "Sla Monitor." The two microservices can each have fields that are specific to particulars of the microservice. In this example of Table 1, microservice "Enrichment" is implemented with Kafka, and has the topic name of "topic-fraudtech-c-fh-branchcoreenrich-prod-blue" and partitions "8, 9, 10, 11"; microservice "Sla Monitor" has the topic name "topic-fraudtech-c-fh-sla-prod." The id in the task field can indicate a hierarchy of operation within a task. For example, in Table 1, step id: 1 has two tasks, task id: 1 is executed first and task id: 2 is executed second.

In some embodiments, the microservice has other associated fields as are related to the particular microservice.

The method can involve sequentially executing, by the orchestrator, one or more microservices in the list of microservices, wherein each time a microservice is executed results of the execution are added to the message to create the stateful message (Step 130). For example, assume a message that has a configuration file with a list of microservices that is three microservices. The message can be sent through the first microservice of the three microservices. The results from the first microservice execution can be added to the message. The message with the results from the first microservice execution can be sent to the second microservice. The results from the second microservice can be added to the message, such that message has the results from the first microservice and the results from the second microservice. The message with the results from the first microservice and the second microservice can be sent to the third microservice. In this manner, the state of each microservice service execution can be included as part of the message, instead of maintained by the orchestrator (or in a file that the orchestrator calls). In this manner, the number of calls made by the orchestrator outside of the system can be reduced, rule based logic within the orchestrator can be reduced and efficiency increased and overall execution time/ functioning of the computer itself improved.

In some embodiments, the orchestrator routes based on conditions, e.g., as input by a user and/or as defined by the particular microservice. Table 2 described below shows an example of conditional routing. Table 2 shows "AAA-Check" having step id: 2, and task id: 1 with routeOnCondition "isAlert" which can mean if "AAACheck" is an alert then step id.: 2, and task id: 1 is used. Otherwise, if "isAlert" is false, then the step is skipped.

TABLE 2

```
name: "AAACheck"
steps:
  - id: 1
    tasks:
      - id: 1
        name: "Decision Engine"
        topicName: "topic-fraudtech-c-fh-rules-prod-blue"
        partitions: "0,1,2,3"
  - id: 2
    tasks:
      - id: 1
        name: "Batch Enricher"
        topicName: "topic-fraudtech-c-fh-batchenrich-prod-blue"
        routeOnCondition: "isAlert"
        partitions: "1,3,2"
  - id: 3
    tasks:
      - id: 1
        name: "Alert"

topicName: "topic-fraudtech-c-fh-alert-prod-blue"
        routeonCondition: "isAlert"
        partitions: "3,4"
      - id: 2
        name: "Persistence"
        topicName: "topic-fraudtech-c-fh-datapersistence-enriched-
        prod-blue"
        partitions: "16,17,18,19,20,21"
      - id: 3
```

TABLE 2-continued

```
        name: "Notification"
        topicName: "topic-fraudtech-c-fh-notify-prod-blue"
        routeOnCondition: "isAlert"
        partitions: "0,1,2,3"
    - id: 4
        name: "PersistencePP"
        topicName: "topic-fraudtech-c-fh-datapersistence-enriched-
        prodp-blue"
        partitions: "16,17,18,19,20,21"
```

In case of a system failure, the message itself can be executed from any point. Continuing with the above example, if the third microservice execution failed, the sequence can be started again from the second microservice. The stateful message can also provide a complete and auditable trail.

The details can include internal processing details and/or transaction information (e.g., message information). The internal processing details can include information about the state of the message, indicator of whether the microservice completed or pending, retry counter and/or reroute counter. The retry counter that can indicate a number of times the microservice has been retried to run in the event it has not previously completed. In some embodiments, the number of retries is limited to a predetermined maximum number of retries. In this manner, the execution of the list of microservices can avoid getting stuck. The predetermined maximum number of retries can be included in the message, input by a user and/or based on the message type and/or reroute counters.

The reroute counter that can indicate a number of times the microservice has rerouted a message in the event it has not previously completed. In some embodiments, the number of reroute is limited to a predetermined maximum number of reroute. In this manner, the execution of the list of microservices can avoid getting stuck. The predetermined maximum number of reroute can be included in the message, input by a user and/or based on the message type.

In some embodiments, internal process details can include process type, transaction type (e.g., message name), transaction flow (e.g., microservices used and state) and/or retry.

The transaction information can include real transaction information (e.g., wire details or transfer amount). In some embodiments, the real transaction information can include a list of microservices, current start time and/or whether the microservice was completed.

Turning to FIG. 2, FIG. 2A is an example of a message according to the prior art, FIG. 2B is an example of a message having a plurality of microservice outcomes added to the message, according to some embodiments of the invention. For the message up to the end of "transaction type" 205 both the messages in FIG. 2A and FIG. 2B are the same. As shown in FIG. 2B, a plurality of microservice outcomes are added to the message. For each microservice "Scorer" 210, "Enrichment" 215, and "Decision Engine" 220 a completed field is added to the message.

Creating a stateful message an allow updating of the execution flows without having to reprogram the orchestrator. In a fraud detection system, latest fraud rules, thresholds and/or scoring models may change to keep up with real-time threats. In some embodiments the configuration file can be updated in real time.

In some embodiments, the stateful message and stateless orchestration can also allow for scalability, in that the stateless orchestrators can be replicated easily without coordination (e.g., ideal for cloud-native deployments).

Figure 3:
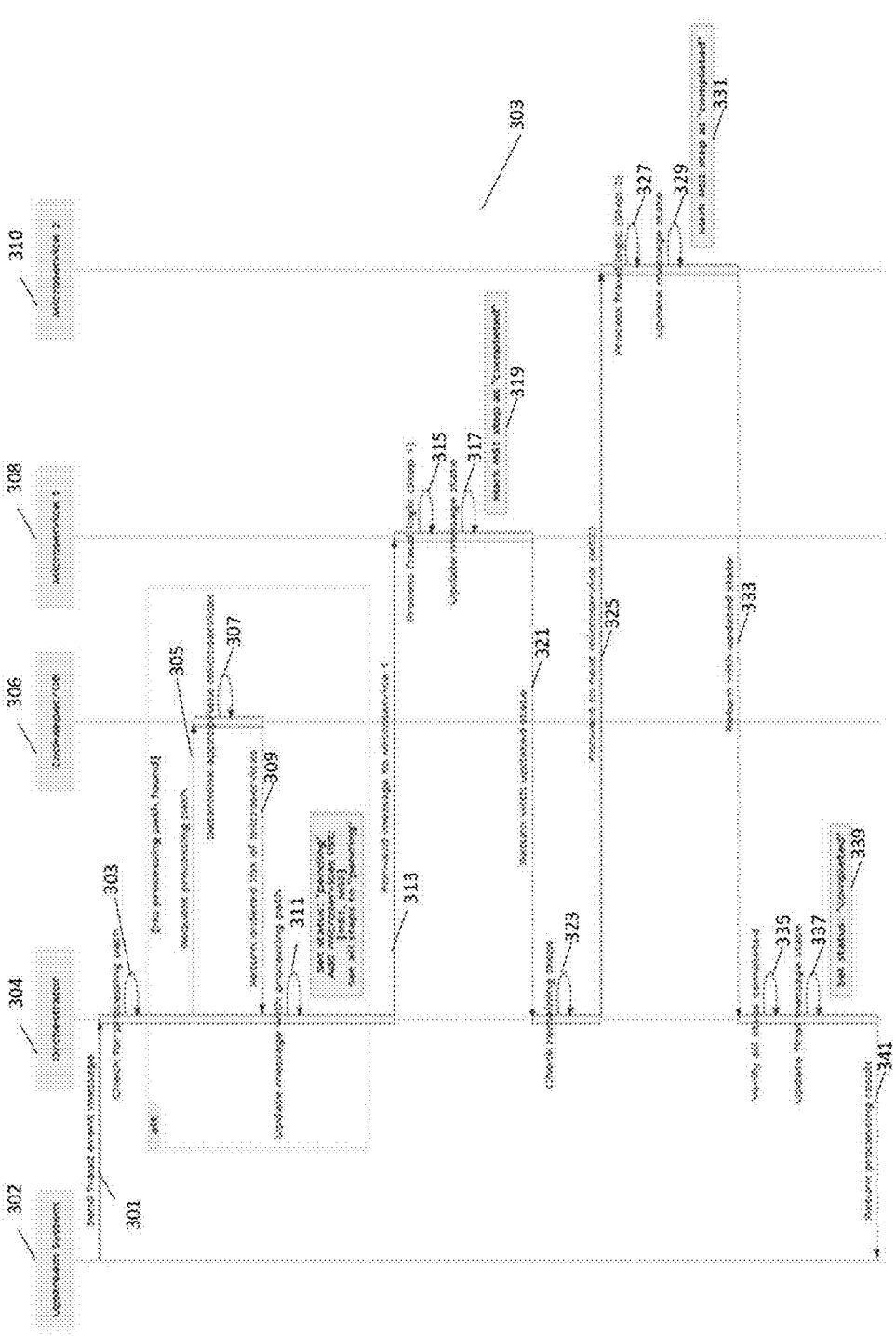
FIG. 3 shows an example of a sequence diagram for an example message for stateless orchestration and stateful message, according to some embodiments of the invention.

FIG. 3 shows an example of a sequence diagram for an example message for stateless orchestration and stateful message, according to some embodiments of the invention.

An upstream system 302 can transmit a message, in this example a "fraud event message" 301 to an orchestrator 304. The orchestrator 304 can determine if there is a processing path for microservices 303 for the message based on whether the message has been priorly received. If there is a processing path for the message, then the orchestrator 304 message is forwarded to a first microservice 308.

If there is not a processing path for the message, then the orchestrator 304 can request a processing path for microservices from a database 305. The processing path can be stored based on message type. The processing path can be stored as a key value pair. The database 305 can be zookeeper.

The microservices can be determined 307 at the database 306. An ordered list of microservices 309 can be sent to the orchestrator 304. The orchestrator 304 an update the message with the processing path for microservices 311. Once the microservices are determined, the orchestrator 304 then the message is forwarded to a first microservice 308.

The first microservice 308 can process the fraud message 315 and update the message state 317 with microservice details. The first microservice 308 can be indicated in the message as complete 319. The first microservice 308 can return the message with an updated state 321, including the microservice update to the orchestrator 304.

The orchestrator 304 can check for additional microservices in the process 323. The orchestrator 304 then sends the message 325 to the second microservice 310. The second microservice 310 can process the fraud message 327 and update the message state 329 with microservice details. The second microservice 310 can be indicated in the message as complete 331. The second microservice 310 can return the message with an updated state 331, including the microservice update to the orchestrator 304.

The orchestrator 304 can verify all of the steps are complete 335, set the status as complete 339, update the message with a final state 337 and return the processed results 341 to the upstream system 302.

As described in the foregoing, the system can allow self-healing by, for example, maintaining state information within the message itself, which can enable an intelligent determination of which microservice to route to next, even in the event of failures. All errors (or substantially all errors) can be explainable, the stateful message can be inspected (e.g., by another computing device or a support team member) to understand the transaction's history and any issues encountered. A lack of reliance on external I/O operations can allow the system to be highly scalable, e.g., capable of processing millions of messages per day with low latency.

Figure 4:
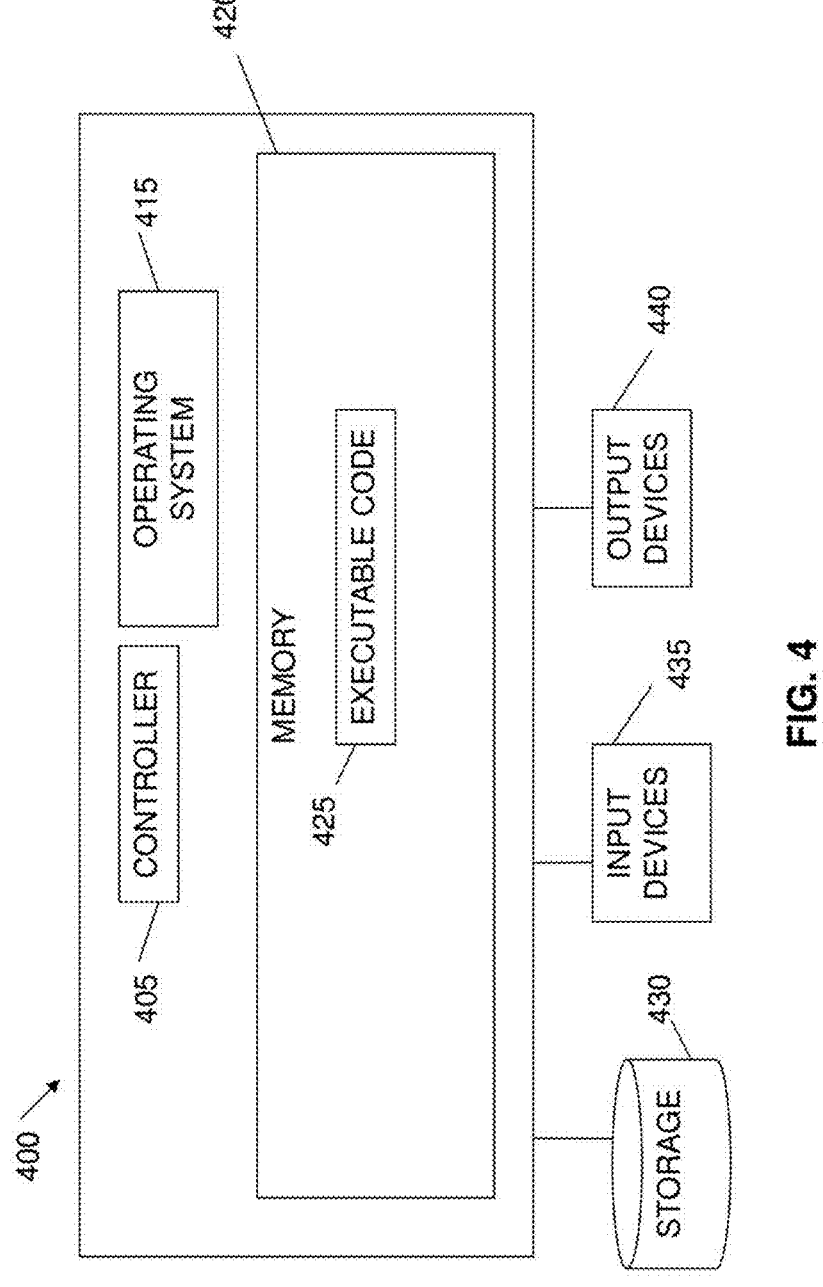
FIG. 4 shows a block diagram of a computing device which can be used with embodiments of the invention.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for stateless orchestration and stateful message, the method comprising:

receiving, by an orchestrator of a processor, an initial message indicating a transaction and a message type;

determining, by the orchestrator of the processor, an ordered processing path including the initial message by retrieving, from memory, a configuration record based on the message type, the configuration record indicating a list of microservices the message requires to execute the transaction based on a type of the message and the order of execution for the list of microservices;

creating, by the processor, a first stateful message by adding the ordered processing path to the initial message;

sequentially executing, by the orchestrator of the processor, at least two microservices in the list of microservices in accordance with the ordered processing path, wherein each time a microservice is executed results of the execution are automatically appended to the first stateful message to create a second stateful message, wherein the each appended result is input to the next microservice executed, and wherein the orchestrator refrains from storing results of the execution external to the second stateful message;

upon failure of one or more microservices in the list of microservice, automatically reverting, by the processor, to a prior microservice that was successful and continuing execution along the ordered processing path until either the list of microservices is completed or a maximum number of retries is met using a retry counter that is stored and updated in the second stateful message; and creating a final stateful message based on the second stateful message and any retries.

2. The method of claim 1 further comprising adding details about the message and the list of microservices to the message.

3. The method of claim 2 wherein the details include a classification of the message, type of the transaction, identifier or any combination thereof.

4. The method of claim 1 wherein the results of the execution include whether the microservice completed, time of the execution, retry count, error codes or any combination thereof.

5. The method of claim 1 wherein determining the list of microservices further comprises retrieving lookup table from memory.

6. A system for stateless orchestration and stateful message, the system comprising:

a memory; and a processor including an orchestrator configured to:

receiving an initial message indicating a transaction and a message type;

determining an ordered processing path including the initial message by retrieving, from memory, a configuration record based on the message type, the configuration record indicating a list of microservices the message requires to execute the transaction based on a type of the message and the order of execution for the list of microservices;

sequentially executing at least two microservices in the list of microservices according to the ordered processing path, wherein each time a microservice is executed results of the execution are automatically appended to the first stateful message to create a second stateful message, wherein the each appended result is input to the next microservice executed, and wherein the orchestrator refrains from storing results of the execution external to the second stateful message;

upon failure of one or more microservices in the list of microservice, automatically revert, by the processor, to a prior microservice that was successful and continuing execution along the ordered processing path until either the list of microservices is completed or a maximum number of retries is met using a retry counter that is stored and updated in the second stateful message; and create a final stateful message based on the second stateful message and any retries.

7. The system of claim 6 wherein the orchestrator is further configured to add details about the message and the list of microservices to the message.

8. The system of claim 7 wherein the details include a classification of the message, type of the transaction, identifier or any combination thereof.

9. The system of claim 6 wherein the results of the execution include whether the microservice completed, time of the execution, retry count, error codes or any combination thereof.

10. The system of claim 6 wherein determine the list of microservices further comprises retrieving lookup table from memory.

* * * * *